Figure 1:
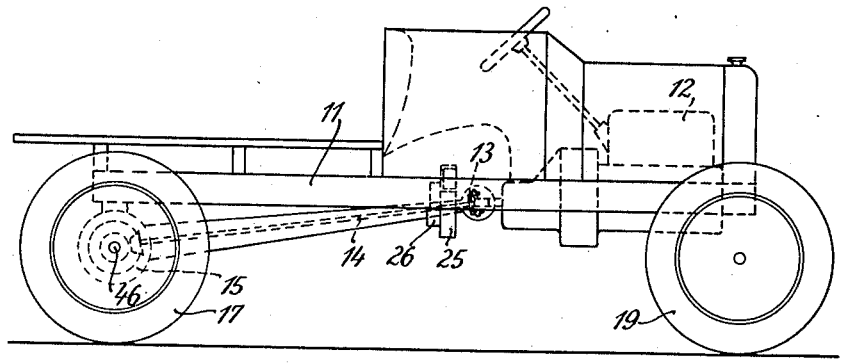

Nov. 6, 1934.  G. HEIDEMANN  1,979,545
AUTOMOTIVE VEHICLE
Filed Jan. 6, 1932  2 Sheets-Sheet 1

Georg Heidemann,
INVENTOR
BY Bean, Brooks + Henry.
ATTORNEYS

Nov. 6, 1934.   G. HEIDEMANN   1,979,545
AUTOMOTIVE VEHICLE
Filed Jan. 6, 1932   2 Sheets-Sheet 2

Georg Heidemann,
INVENTOR

BY Bean, Brooks & Henry.
ATTORNEYS

Patented Nov. 6, 1934

1,979,545

UNITED STATES PATENT OFFICE 1,979,545

AUTOMOTIVE VEHICLE

Georg Heidemann, Hoppegarten-Berlin, Germany

Application January 6, 1932, Serial No. 585,078
In Germany January 14, 1931

6 Claims. (Cl. 180—16)

This invention relates to automotive vehicles, and more particularly to a supplementary or auxiliary device for converting a passenger or freight carrying automobile into a truck for heavier freight, or a passenger or freight carrying vehicle into a tractor.

This supplementary device includes a frame which is so designed as to be fitted underneath the rear portion of a conventional vehicle in place of the driven wheels after the removal of the latter from the main driving shaft and which carries one or more supplementary shafts, as well as a counter or intermediate gearing adapted to transmit the driving force from the main shaft to the supplementary shafts.

One object of the invention is to provide a structure by which the rear wheels of automotive vehicles of any construction can be quickly replaced without the necessity of aligning inter-engaging parts of a ratio gear when mounting such structure.

The construction embodying the invention also provides for so spacing or gauging the wheels of the auxiliary frame that they follow in the tracks of the front wheels of the original vehicle. Moreover, favorable conditions result as regards the stresses in the driving shafts as well as in those gears which transmit the driving power of the motor to the wheels of the auxiliary frame.

The invention furthermore provides for arrangements in which the engine of the vehicle or car drives the wheels of the auxiliary frame through a counter or intermediate gearing incorporated in the auxiliary framework.

According to this invention the auxiliary frame construction or wheeled structure also carries a first motion shaft of the intermediate or counter gear or gearing, this shaft being coupled with the main driving shaft driven by the engine or motor of the vehicle. The term first motion shaft is intended to define the shaft to which the axle of the original vehicle structure transmits motion to the mechanism of the supplemental frame.

Another object of the invention is to design the connection between the first motion shaft of the gear and the main driving shaft driven by the motor or engine of the vehicle in such manner that, besides the driving torques, no detrimental forces are transmitted between driving shaft of the wheels and gear, or vice versa. This object is attained by effecting the connection between the first motion shaft of the gearing and the main driving shaft driven by the motor or engine of the car by means of a universal (Cardan) joint. In a preferred embodiment of my invention the main driving shaft of the vehicle is coupled with the first motion shaft of the counter gear by means of two Cardan joints arranged one behind the other. This arrangement has the advantage that the two shafts to be connected need not be located exactly co-axially or in exact alignment.

A further object of the invention is to locate the driving elements of the supplemental driving wheels in such manner that the driving wheels follow in the tracks of the front wheels.

In one of the preferred arrangements of the structure, very satisfactory results are obtained by supporting the gear upon the axle of the driving wheel extended beyond the driving wheel.

My invention will be better understood on referring to the drawings affixed to my specification and forming part thereof.

Figure 2:
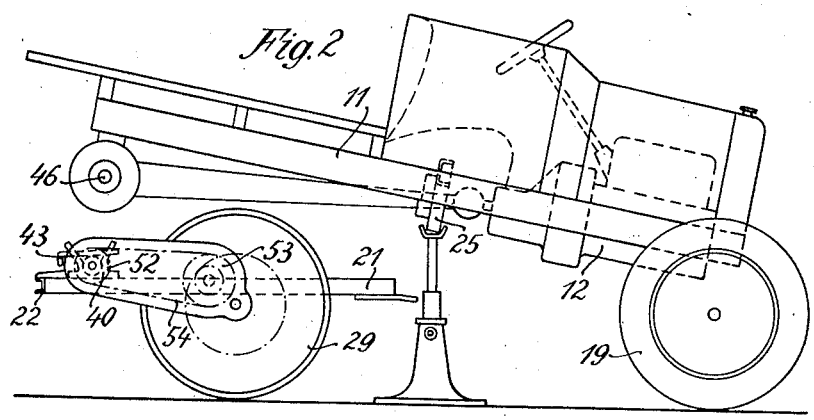
Figure 3:
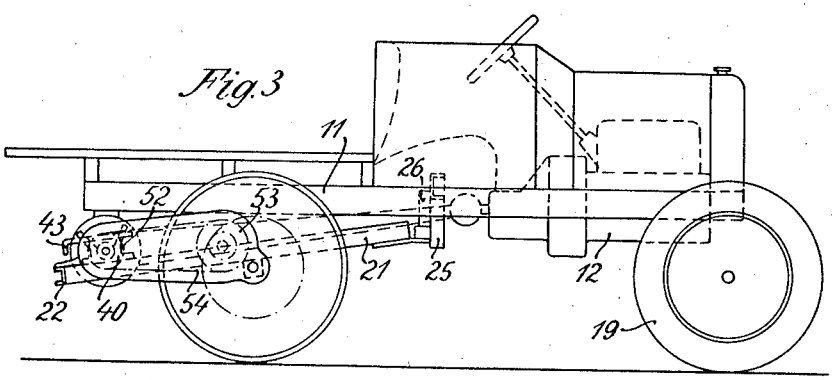
Figure 4:
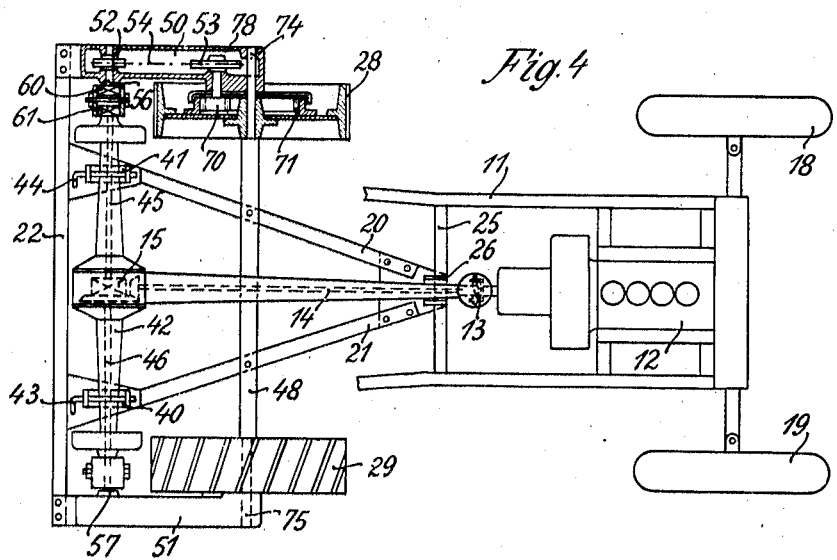
Figure 5:
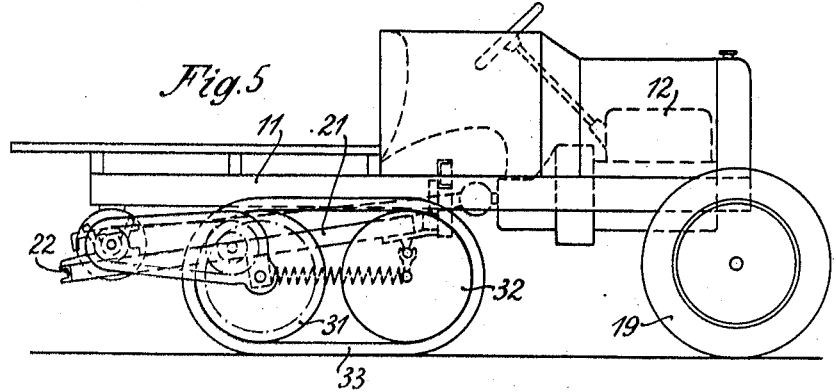
Figure 6:
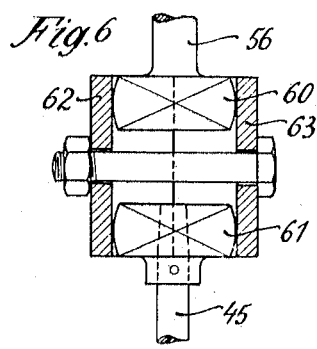
Figure 7:
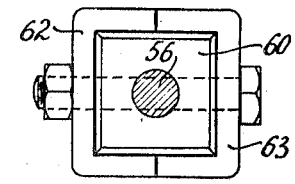

Fig. 1 is a side elevation of an automotive vehicle of conventional construction, Fig. 2 is a side elevation of an automotive vehicle with the rear portion of the chassis raised by means of a suitable jack and the driving wheels removed, while the attachment or auxiliary wheeled structure is being placed in position, Fig. 3 is a side elevation of an arrangement according to my invention in which the auxiliary wheeled structure is in working position, Fig. 4 is a plan of the auxiliary frame, partially in section and the front portion of the vehicle with the body of the motor car removed, Fig. 5 is a side elevation of a further slightly modified embodiment in which the auxiliary frame carries chain-track wheels, Fig. 6 is a section of the coupling between the first motion shaft of the gearing and the main driving shaft operated from the motor of the vehicle, and Fig. 7 is a side-elevation of the coupling shown in Fig. 6.

Referring to the drawings, 11 is the chassis of the automotive vehicle or motor car, in which a conventional motor or engine 12 of any known construction is mounted, and which through the Cardan or universal joint 13, the propeller shaft 14, and the differential 15 drives the original vehicle axle shafts 45 and 46 which support the rear wheels 17.

In the embodiment illustrated by way of example the auxiliary frame consists of the rear member or transverse stay 22 forming a triangle with the two side ties 20, 21, which are supported on a transverse member 25 of the chassis of the motor car at 26 in any suitable known manner, preferably so as to be capable of swivelling and sliding. The attachment or wheeled auxiliary frame carries the driving wheels 28, 29, or as shown in the embodiment of Fig. 5 the chain track wheels 31, 32 together with the track chain 33 of any suitable construction. On suitable bearing or supporting structures of the auxiliary frame is placed the axle housing or box 42 of the differential axle shafts 45 and 46 and locked in position by the bolts 43, 44. The auxiliary frame furthermore carries the wheels 28, 29 mounted on an auxiliary or supplementary axle 48, as well as the gearing 50, 51, which in the example illustrated consists of the sprocket wheels 52, 53 and the chain 54. The first motion shafts 56, 57 of the chain gears also constitute auxiliary or supplementary transmission shafts or shaft sections, and are likewise carried by the auxiliary frame. These shafts are coupled with the shafts 45, 46 driven by the motor of the motor car by Cardan joints 60, 61, i. e. in such a manner that there exist at least two joints adapted to rock around two axles located at right angles to each other. Any suitable construction of the Cardan or universal joint may be employed.

In the example illustrated two Cardan joints at each end of the axle housing 42, illustrated in greater detail in Figs. 6 and 7 and located one behind the other connect the two shafts 45 and 56 together. The Cardan joints consist of square blocks with spherically shaped sides adapted to swivel in all directions within correspondingly shaped shells or bushings 62, 63. Owing to the provision of the double Cardan or universal joints, it is unnecessary to align the axles or shafts 45, 46 accurately with the shafts 56, 57, and these joints 60, 62 and 61, 63 thus serve as disalignment compensating means between the axle sections 45, 46 and auxiliary shafts 56, 57, while the assembled axles, shafts and gears have fixed axes on the vehicle frame. The torques or moments of forces which cause rotation in one axle or shaft are transmitted to the other without permitting objectionable bending stresses to develop.

In the embodiment of my invention illustrated by way of example the drive of the driving wheel, which is effected by means of the internally toothed gearing 70, 71 takes place in such a manner that viewed in plan the drive is located between gearing and vehicle, so that the wheels 28 and 29 driven through the chain gear 52, 53, 54 and the intermediate tooth gearing 70, 71, follow in the track of the front-wheels 18, 19. The axle 48 of the wheels 28, 29 is extended at both ends and carries at 74, 75 the intermediate or counter gearing 50, 51 so that a rigid and secure arrangement of the gearing is obtained. The gearing may according to my invention be accommodated in a closed housing 78 up to its first motion shaft so that the sensitive parts of the mechanism are effectively protected against disturbances from the ground or interferences by unauthorized persons, even under the severest working conditions.

It will be readily understood that various structural modifications or changes may be made without departing from the spirit of my invention or the scope of the appended claims.

I claim as my invention:

1. In a motor vehicle having a propeller shaft together with an original vehicle axle shaft, a supplementary frame adapted to be substituted for the rear wheels of the original vehicle, wheels mounted upon the frame for supporting the rear of the vehicle, a supplementary axle shaft mounted upon the frame for supporting the wheels of the frame, an auxiliary transmission shaft mounted upon the frame in general alignment with said vehicle axle shaft, gearing for transmitting power from the transmission shaft to the wheels of the frame, means compensating for disalignment between said vehicle axle shaft and said auxiliary axle shaft, and means for connecting the auxiliary transmission shaft to the propeller shaft.

2. In a convertible motor vehicle having permanent driving members adapted to be attached to conventional rear wheels of the vehicle, a frame having wheels thereon supporting the rear portion of the vehicle, a power transmission gearing on the frame for transmitting power to the wheels of the frame, and compensating means connecting said power transmission gearing to the permanent driving members, the axes of the permanent driving members and transmission gearing in assembled relation having fixed positions on the vehicle, said compensating means being operable in various relative positions of said power transmission gearing and permanent driving members for insuring effective transmission of power to the wheels of the frame regardless of inaccuracies in mounting said gearing and members.

3. In a motor vehicle having a propeller shaft, a supplementary frame adapted to be substituted for the rear wheels of the original vehicle, wheels mounted upon the frame for supporting the rear of the vehicle, a supplementary axle shaft mounted upon the frame for supporting the wheels of the frame, an auxiliary transmission shaft mounted upon the frame, and having its axis stationary with respect to the frame in its operative assembled position, gearing for transmitting power from the transmission shaft to the wheels of the frame, and a flexible shafting section for connecting the auxiliary transmission shaft to the propeller shaft.

4. In a motor vehicle having a propeller shaft, a supplementary frame adapted to be substituted for the rear wheels of the original vehicle, wheels mounted upon the frame for supporting the rear of the vehicle, a supplementary axle shaft mounted upon the frame for supporting the wheels of the frame, an auxiliary transmission shaft mounted upon the frame, and having its axis stationary with respect to the frame in its operative assembled position, gearing for transmitting power from the transmission shaft to the wheels of the frame, and a Cardan joint for connecting the auxiliary transmission shaft to the propeller shaft for driving the wheels of the frame from said propeller shaft.

5. In a motor vehicle having a propeller shaft, a supplementary frame adapted to be substituted for the rear wheels of the original vehicle, wheels mounted upon the frame for supporting the rear of the vehicle, a supplementary axle shaft mounted upon the frame for supporting the wheels of the frame, an auxiliary transmission shaft mounted upon the frame, gearing supported by the supplementary frame for transmitting power from the transmission shaft to the wheels of the frame, said supplementary axle shaft extending outwardly beyond its wheels, and disalignment compensating means connecting the auxiliary transmission shaft to the propeller shaft.

6. In a convertible motor vehicle having permanent axle shafts designed to drive original rear wheels of the vehicle, a frame having wheels thereon supporting the rear of the vehicle, power transmission gearing mounted on the frame for transmitting power to the wheels of the frame, flexible shafting sections extending longitudinally from the outer ends of the axle shafts for transmitting force from the latter in axially offset relation thereto, and means connecting the flexible shafting sections to the axle shafts and gearing.

GEORG HEIDEMANN.